United States Patent
Andrews et al.

(10) Patent No.: US 8,939,751 B2
(45) Date of Patent: Jan. 27, 2015

(54) ANNULAR DIE SPIRAL GROOVE CONFIGURATION

(71) Applicant: Gloucester Engineering Co., Inc., Gloucester, MA (US)

(72) Inventors: Michael Charles Andrews, Beverly, MA (US); Chad Allen Biron, Gloucester, MA (US); William Welsh Bode, Essex, MA (US); William Ellery Jones, Gloucester, MA (US); Bruce Michael O'Connor, Gloucester, MA (US); Mark Dean Steele, Rockport, MA (US)

(73) Assignee: Gloucester Engineering Co., Inc., Blackburn Industrial Park, Gloucester, MA (US)

( * ) Notice: Subject to any disclaimer, the term of this patent is extended or adjusted under 35 U.S.C. 154(b) by 0 days.

(21) Appl. No.: 14/122,996

(22) PCT Filed: Mar. 29, 2013

(86) PCT No.: PCT/US2013/034655
§ 371 (c)(1),
(2) Date: Nov. 27, 2013

(87) PCT Pub. No.: WO2013/149176
PCT Pub. Date: Oct. 3, 2013

(65) Prior Publication Data
US 2014/0087015 A1      Mar. 27, 2014

Related U.S. Application Data

(60) Provisional application No. 61/617,403, filed on Mar. 29, 2012.

(51) Int. Cl.
*B29C 47/20* (2006.01)
*B23C 3/32* (2006.01)

(52) U.S. Cl.
CPC .. *B29C 47/20* (2013.01); *B23C 3/32* (2013.01)
USPC .......................................... 425/380; 425/461

(58) Field of Classification Search
CPC .... B29C 47/20; B29C 47/263; B29C 47/265; B29C 47/702; B29C 47/705
USPC .......................................... 425/380, 461, 467
See application file for complete search history.

(56) References Cited

U.S. PATENT DOCUMENTS

| | | | | |
|---|---|---|---|---|
| 4,298,325 | A * | 11/1981 | Cole ......................... | 425/192 R |
| 5,690,972 | A * | 11/1997 | Planeta et al. ............. | 425/133.1 |
| 5,738,881 | A * | 4/1998 | Sagar ........................ | 425/133.1 |
| 6,702,563 | B2 * | 3/2004 | Sensen et al. ............. | 425/133.1 |
| 2007/0172536 | A1 * | 7/2007 | Mahler et al. .................. | 425/464 |

* cited by examiner

*Primary Examiner* — Yogendra Gupta
*Assistant Examiner* — Joseph Leyson
(74) *Attorney, Agent, or Firm* — Joseph M. Rolnicki; Evans & Dixon, LLC

(57) ABSTRACT

An annular die has a mandrel having a spiral groove formed in a surface of the mandrel that distributes a flow of liquid across the mandrel surface and directs the flow of liquid in a flow direction across the spiral groove and across the mandrel surface. At least a portion of the spiral groove has a cross-section configuration where an interior surface of the spiral groove portion is oriented toward the flow direction as the interior surface extends to and intersects with the mandrel surface. The annular die has particular, but not limited, application as a blown film die.

17 Claims, 12 Drawing Sheets

ANNULAR DIE SPIRAL GROOVE CONFIGURATION

BACKGROUND OF THE INVENTION

1. Field of the Invention

The present invention pertains to the cross-section configuration of a spiral groove in a mandrel surface of an annular die and the method of producing the groove configuration. More specifically, the present invention pertains to the cross-section configuration of a spiral groove cut into a mandrel surface of an annular die where the groove configuration approaches an "almost round" cross-section configuration and the method of cutting the groove.

2. Description of the Related Art

In the production of blown film where a hot liquid polymer melt stream is distributed around a cylindrical gap inside a die prior to being blown from the die to produce a tubular film, at least one mandrel is often employed in the die where the mandrel has a spiral groove formed in a cylindrical exterior surface or a cylindrical interior surface of the mandrel. The hot liquid melt is delivered through the spiral groove to distribute the melt around the cylindrical gap inside the die prior to being blown from the die. Examples of such mandrel constructions are disclosed in FIG. 3 of the Cole U.S. Pat. No. 4,201,532, incorporated herein by reference and FIG. 1 of the Gates U.S. Pat. No. 5,261,805, also incorporated herein by reference.

A blown film die can be comprised of several coaxial cylindrical mandrels assembled together on a common base. In this type of die construction typically more than one of the mandrels has a spiral groove. An example of such a blown film die is disclosed in FIG. 1 of the Mahler U.S. Pat. No. 7,811,073, incorporated herein by reference.

The spiral grooves on the mandrel surfaces are typically fed from a hot liquid melt stream that flows through a number of feeders or ports that each lead to a spiral groove. The feeders or ports can be located upstream of the mandrel or can be formed on the mandrel itself. The feeders or ports can be machined along the exterior surface of the mandrel as shown in FIG. 1 of the Mahler, et al. patent or can be machined through the mandrel in an encapsulated construction as shown in FIG. 1 of the Cole patent. In addition, the feeders or ports may feed more than one spiral in a "Y" configuration as shown in FIG. 1 of the Mahler, et al. patent.

The spiral geometry is typically designed where the depth and width of the spiral decreases as the spiral extends from its feeder or port around the mandrel surface and toward the discharge end of the blown film die. At the same time, the axial spacing between adjacent spirals increases as the spirals extend around the mandrel surface and toward the discharge end of the blown film die.

The conventional cross-sectional shape or configuration of a mandrel spiral is usually semi-circular or "D" shaped. This is shown in drawing FIG. 1 and FIG. 1 of the Cole patent. Additionally, the spiral groove can be cut in the cylindrical exterior surface of a mandrel as shown in FIG. 1 of the Mahler et al. patent, the cylindrical interior surface of a mandrel as shown in FIG. 1 of the Mahler et al. patent, or both as shown in FIGS. 3-5 of the U.S. Patent Publication of Stommel No. US2004/0166192, incorporated herein by reference. This is also shown in FIG. 1 of the Mahler, et al. patent.

SUMMARY

The annular die of the invention and its method of manufacture provide a spiral groove in a mandrel surface of the die that has a unique cross-section configuration. The annular die has particular utility as a blown film die for use in the manufacture of blown film products. However, the present invention annular die can be used in other applications beyond that of a blown film die. The cross-section configuration of the spiral groove approaches an almost round or circular configuration in contrast to the "D" shaped configuration of prior art spiral grooves. The cross-section configuration of the spiral groove increases the velocity of flow of a liquid (typically, but not limitedly, a hot liquid polymer melt) through certain parts of the cross-section of the spiral groove over that of conventional spiral groove configurations. The mass flow rate through the groove stays substantially constant, but the velocity distribution of the flow through the groove cross-section changes. Therefore, the velocity distribution of the flow through the groove is more uniform. This improves the distribution of the polymer melt through the cylindrical gap of the die and reduces the residence time of the melt in the slow moving areas to reduce the chance of degradation. One method of forming the groove in the mandrel surface is produced with a "lollipop" shaped or "undercutting" end mill.

BRIEF DESCRIPTION OF THE DRAWINGS

Further features of the annular die spiral groove configuration and its method of manufacture are set forth in the following detailed description and drawing figures.

DETAILED DESCRIPTION OF THE INVENTION

Figure 2:
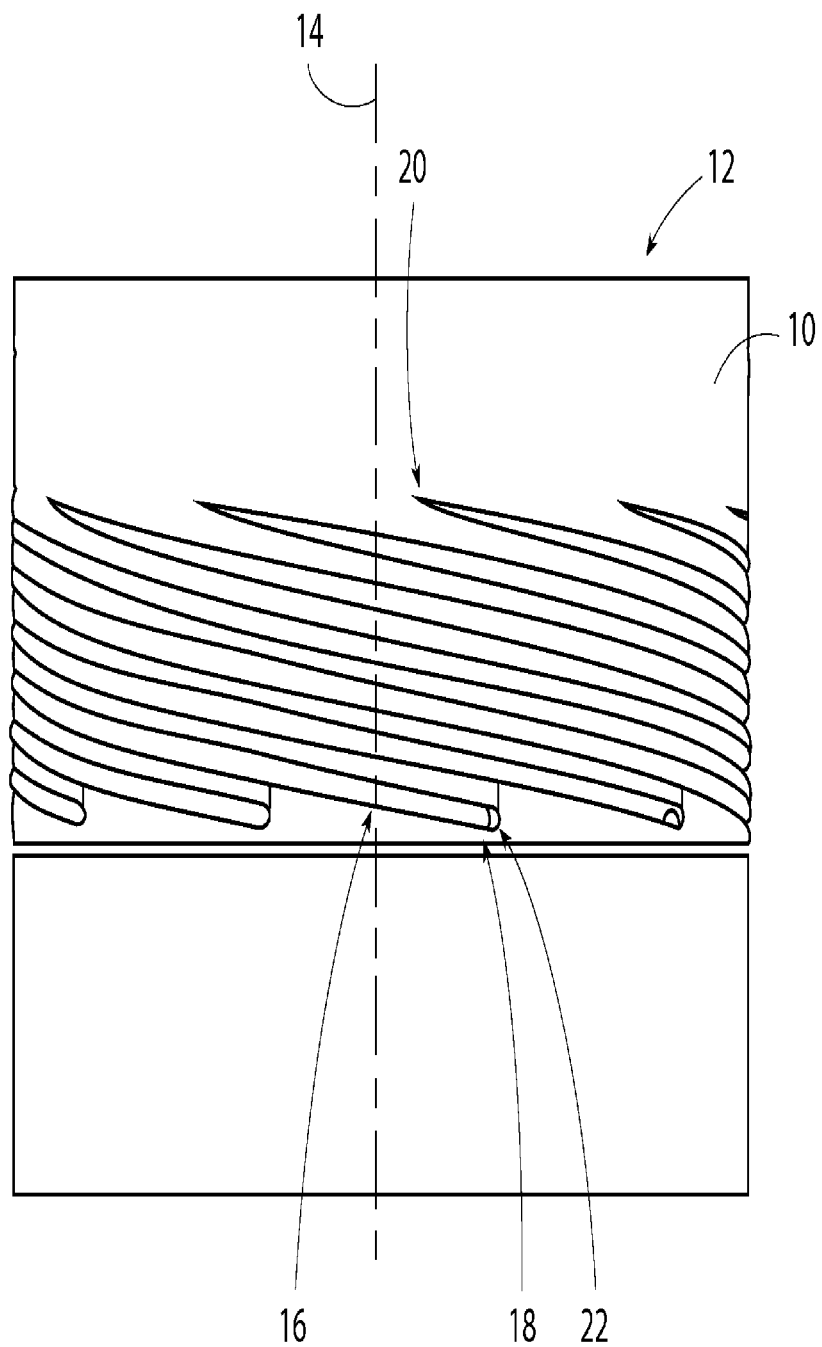
FIG. 2 is a representation of a cylindrical mandrel of a blown film die having spiral grooves formed in its exterior surface that have the cross-section configurations of the spiral grooves that are the subject of the invention.

FIG. 2 is a representation of a cylindrical blown film die mandrel having one of the spiral groove configurations of the invention formed in the exterior surface of the mandrel. FIG. 2 is representative of only one type of annular blown film die mandrel on which the spiral groove configurations of the invention may be employed. The spiral groove configurations of the invention may be employed on many other types of blown film die mandrels, as will be explained. The spiral groove configurations of the invention are only disclosed as being formed on the cylindrical exterior surface of the mandrel shown in FIG. 2 to describe the structural features of the spiral groove configurations. It should be understood that the spiral groove configurations of the invention may be employed on other types of annular or blown film die mandrels other than the cylindrical configurations to be described, and that the spiral groove configurations of the invention should not be limited to only spiral grooves on the exterior surface of a cylindrical blown film die mandrel.

Figure 3:
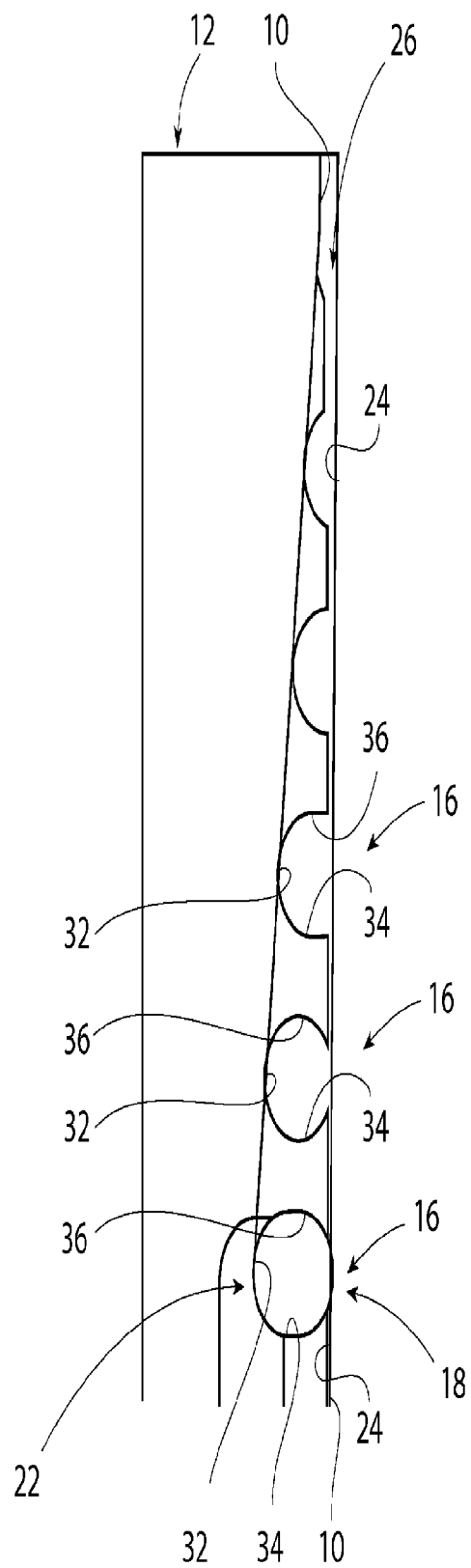
FIG. 3 is a representation of a cross-section of an annular die mandrel surface employing a spiral groove configuration of the invention.

Referring to FIGS. 2 and 3, a first embodiment of the spiral groove configuration of the invention is shown on the cylindrical exterior surface 10 of a blown film die mandrel 12. The cylindrical mandrel 12 has a center axis 14 that defines mutually perpendicular axial and radial directions relative to the mandrel. Each of the spiral grooves 16 formed on the mandrel 12 employ the groove cross-section configuration of the invention to be described. Therefore, the features of the spiral groove configuration will be described by referring to only one spiral groove 16.

Referring to FIG. 2, the spiral groove 16 has a length that extends around the mandrel surface 10 from a proximal end 18 of the groove to a distal end 20 of the groove. The proximal end 18 of the groove 16 is typically fed from a hot liquid melt stream delivered to the groove through a feeder or port 22. Referring to FIG. 3, the mandrel exterior surface 10 and the groove 16 are shown being opposed by a cylindrical interior surface 24 of another mandrel, or a cylindrical interior surface of the die. There is a narrow cylindrical gap 26 between the mandrel surface 10 and the opposing interior surface 24. The liquid flow received by the groove 16 is directed by the groove from the groove proximal end 18 toward the groove distal end 20. The flow of liquid is also directed axially upward in a flow direction across the spiral groove 16 and across the mandrel surface 10 as shown in FIG. 3 through the gap 26 between the mandrel surface 10 and the interior surface 24. This distributes the flow of liquid across the mandrel surface 10 and around the cylindrical gap 26.

In the first embodiment of the spiral groove configuration shown in FIG. 3, the beginning of or proximal end 18 of the spiral groove 16 is shown communicating with the port 22 at the bottom of FIG. 3. The beginning of the groove 16 is machined or cut into the mandrel surface 10 with a cross-section configuration that approaches a circular shape. A portion of the spiral groove 16 adjacent the spiral groove proximal end 18 is formed with a bottom surface 32, a first side surface 34 and a second side surface 36. The second side surface 36 is located on an opposite side of the bottom surface 32 from the first side surface 34. The spiral groove bottom surface 32 has a general "U" shaped configuration, or a "D" shaped cross-section configuration similar to that of the prior art. However, the cross-section configuration of the spiral groove between the bottom surface 32 and the opening of the groove in the mandrel surface 10 is unique. This portion of the spiral groove adjacent the spiral groove proximal end 18 is formed having a cross-section configuration where the first side surface 34 of the groove portion curves toward or is oriented toward the flow direction, or axially upwardly as viewed in FIG. 3, as the first side surface 34 extends from the bottom surface 32 to the mandrel surface 10. The spiral groove second side surface 36 is a mirror image of the first side surface 34. The second side surface has a cross-section configuration where the second side surface curves against or is oriented opposite the flow direction through the gap 24, or axially downwardly as viewed in FIG. 3, as the second side surface 36 extends from the bottom surface 32 to the mandrel surface 10. The cross-section configuration of the spiral groove approaches an almost round or circular configuration in contrast to the "D" shaped configuration of prior art spiral grooves. The cross-section configuration of the spiral groove increases the velocity of flow of a liquid (preferably a hot liquid polymer melt) through certain parts of the cross-section of the spiral groove over that of conventional spiral groove configurations. The mass flow rate through the groove stays substantially constant, but the velocity distribution of the flow through the groove cross-section changes. Therefore, the velocity distribution of the flow through the groove is more uniform. This improves the distribution of the polymer melt through the cylindrical gap of the die and reduces the residence time of the melt in the slow moving areas to reduce the chance of degradation.

The cross-section configuration of the portion of the spiral groove 16 adjacent the groove proximal end 18 could be applied to the entire length of the spiral groove 16 formed in the mandrel surface 10. Alternatively, as shown in FIG. 3, as the spiral groove 16 extends around the mandrel surface 10 from the proximal end 18 to the distal end 20 of the groove, the cross-section configuration changes from the almost round configuration shown at the bottom of FIG. 3, to a semi-circular cross-section configuration as the spiral groove 16 gets narrower and shallower as it progresses upwardly across the mandrel surface 10.

Figure 4:
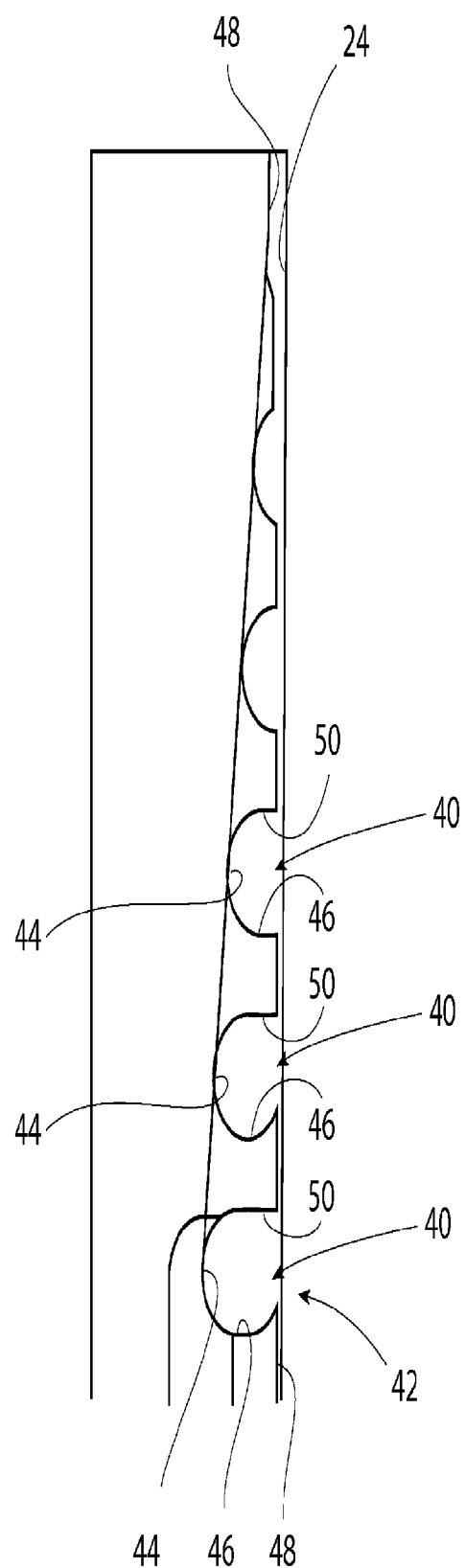
FIG. 4 is a representation of a cross-section of an annular die mandrel surface employing a further embodiment of the spiral groove configuration of the invention.

FIG. 4 is a representation of a cross-section of a second embodiment of the spiral groove 40. In the second embodiment at least a portion of the groove 40 adjacent the groove proximal end 42 includes the groove bottom surface 44 configuration of the previously described embodiment of FIG. 3, and the groove first side surface 46 configuration of the previous embodiment. This portion of the spiral groove 40 has a bottom surface 44 with a general "U" shaped configuration or a "D" shaped cross-section configuration similar to that of the prior art. However, the cross-section configuration of the spiral groove between the bottom surface 44 and the opening of the groove in the mandrel surface is unique. This portion of the groove 40 also has a first side surface 46 that curves toward or is oriented toward the flow direction, or axially upwardly as viewed in FIG. 4, as the first side surface 46 extends from the bottom surface 44 and intersects with the mandrel surface 48. The cross-section configuration of this portion of the groove 40 differs from that of FIG. 3 in that the groove second side surface 50 opposite the groove first side surface 46 extends substantially perpendicular to the flow direction from the groove bottom surface 44 to its intersection with the mandrel surface 48.

Again, the cross-section configuration of the spiral groove 40 shown in FIG. 4 could be applied for the entire length of the spiral groove formed in the mandrel surface 48. Alternatively, as the spiral groove 40 extends around the mandrel surface 48 from the groove proximal end 42 toward the groove distal end, the cross-section configuration could change from the configuration shown at the bottom of FIG. 4, to a semi-circular cross-section configuration shown at the top of FIG. 4 as the spiral groove 40 gets narrower and shallower as it progresses along the mandrel surface 48.

Figure 5:
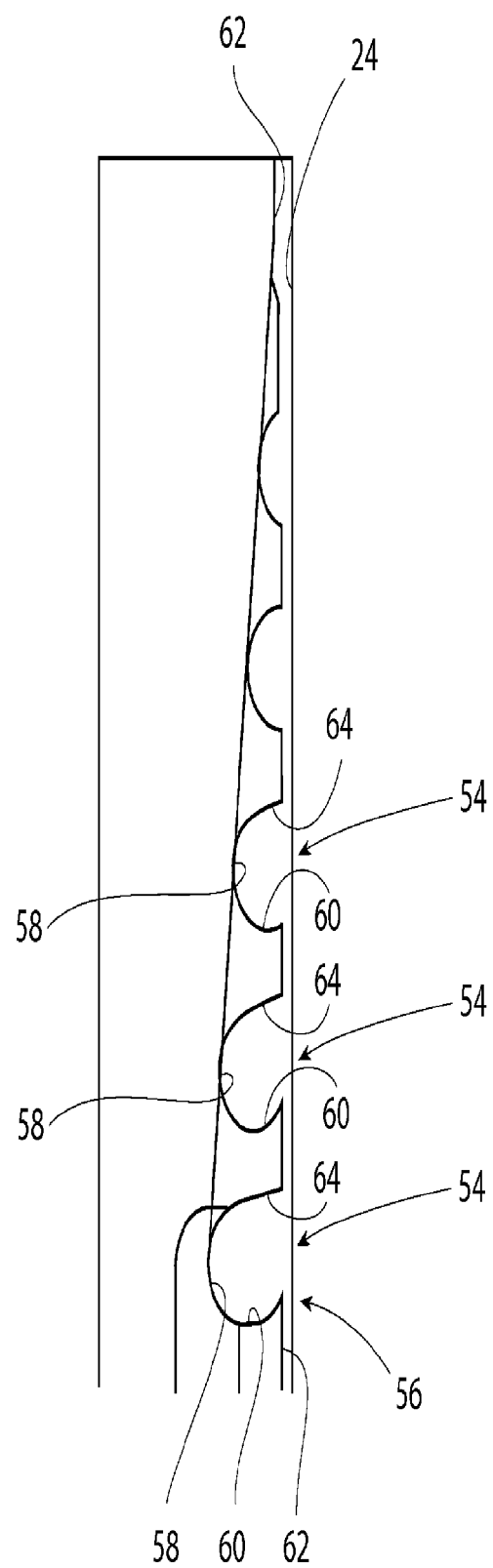
FIG. 5 is a representation of a cross-section of an annular die mandrel surface employing a further embodiment of the spiral groove configuration of the invention.

FIG. 5 shows a third embodiment of the spiral groove 54. At least a portion of the spiral groove 54 adjacent the groove proximal end 56 has a cross-section configuration that is similar to that of the embodiments of FIGS. 3 and 4. The third embodiment of the spiral groove 54 shown in FIG. 5 has a bottom surface 58 having a general "U" shaped cross-section configuration or a "D" shaped cross-section configuration that is substantially the same as the embodiments of FIGS. 3 and 4. Additionally, the third embodiment of the spiral groove 54 has a first side surface 60 having a cross-section configuration that is substantially the same as the embodiments of FIGS. 3 and 4. The groove first side surface 60 has a cross-section configuration where the side surface curves toward or is oriented toward the flow direction or axially upwardly as viewed in FIG. 5 as the side surface 60 extends from the groove bottom surface 58 toward the mandrel surface 62 and intersects with the mandrel surface. The cross-section configuration of the portion of the groove 54 adjacent the groove proximal end 56 differs from that of the previously described embodiments in that the groove second side surface 64 that is opposite the first side surface 60 is angled toward or oriented toward the flow direction, or axially upwardly, as the second side surface 64 extends from the bottom surface 58 to the mandrel surface 62 and intersects with the mandrel surface.

As with the previously described embodiments, a cross-section configuration of the spiral groove 54 adjacent the groove proximal end 56 could be applied for the entire length of the spiral groove formed in the mandrel surface 62. Alternatively, as the spiral groove 54 extends around the mandrel surface 62 from the groove proximal end 56 toward the groove distal end, the cross-section configuration could change from the configuration shown at the bottom of FIG. 5, to a semi-circular cross-section configuration as the spiral groove extends upwardly as shown in FIG. 5 and gets narrower and shallower as it progresses toward the mandrel surface 62.

Figure 6:
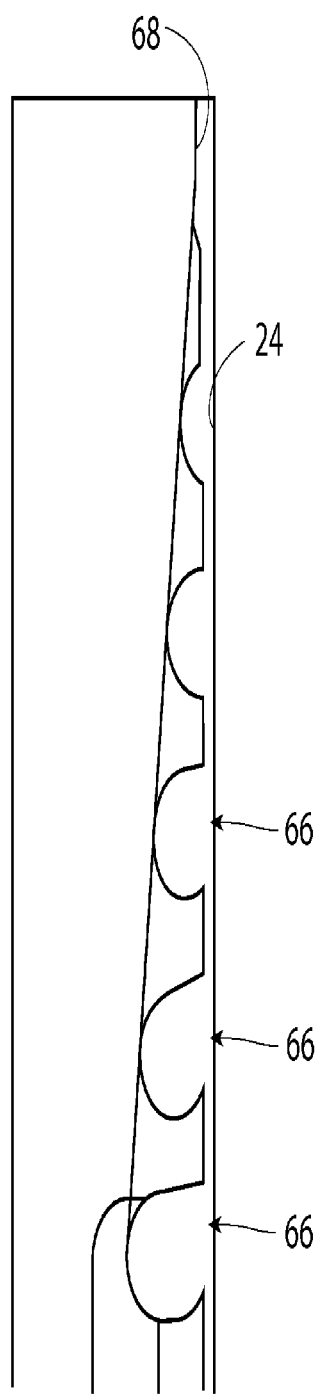
FIG. 6 is a representation of a cross-section of an annular die mandrel surface employing a further embodiment of the spiral groove configuration of the invention.

FIG. 6 is a representation of a cross-section of a fourth embodiment of the spiral groove configuration. The spiral groove 66 shown in FIG. 6 has basically the same cross-section configuration as that shown in FIG. 5. However, where the gap between the mandrel surfaces and the cylindrical interior surfaces shown in FIGS. 3, 4 and 5 has a slight clearance at its bottom that may or may not be sealed with a seal (not shown), the gap between the mandrel surface 68 and the cylindrical interior surface 14 shown in FIG. 6 has a zero clearance where the mandrels are in intimate contact.

Figure 7:
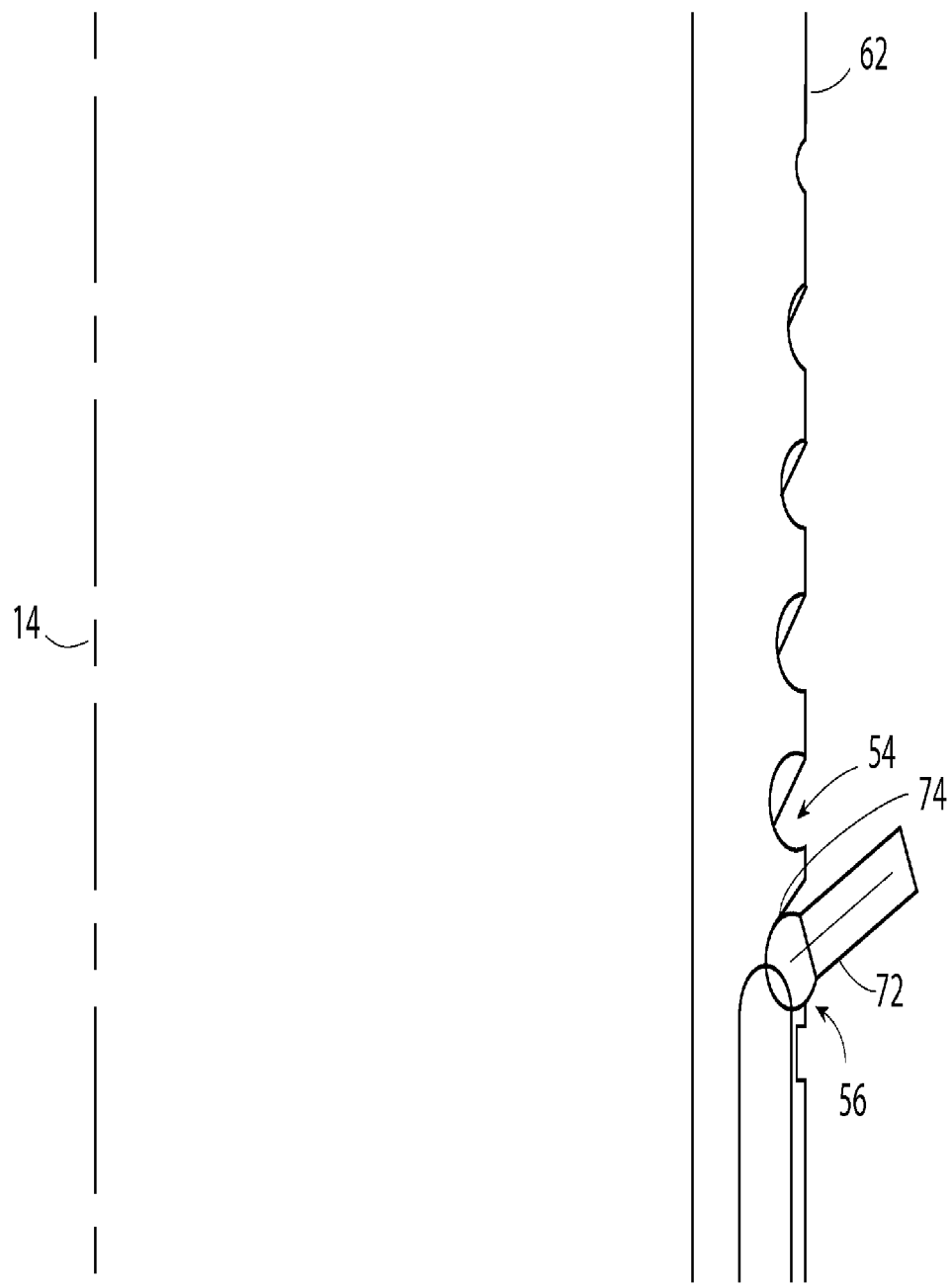
FIG. 7 is a representation of a cross-section of a blown film die mandrel surface having the spiral groove configuration of the invention formed in the surface of the mandrel according to the method of the invention.

FIG. 7 is a representation of one method of manufacturing the spiral groove configurations of the invention on the exterior surface of a cylindrical blown film die mandrel. Although the method represented by FIG. 7 is performed on a cylindrical exterior surface of a blown film die mandrel, the method could equally well be practiced on a cylindrical interior surface of a mandrel such as that shown in FIG. 8, a horizontal or planar surface of a mandrel such as those shown in FIGS. 9 and 10, an angled surface of a mandrel such as those shown in FIGS. 11 and 12 as well as other equivalent surfaces of blown film dies.

Any number of known machining tools or methods could be employed in forming the spiral groove cross-section configuration of the invention as represented by the embodiments of FIGS. 3-5. One method represented in FIG. 7 employs an end mill and more specifically an end mill 72 having a lollipop shaped cutting end 74. In FIG. 7 the end mill 72 is shown cutting the spiral groove cross-section configuration of the third embodiment of the spiral groove 54 formed in the mandrel surface 62 of FIG. 5. However, the end mill 72 could be used to form the spiral groove cross-section configurations of any of the embodiments of FIGS. 3-5. The lollipop shaped cutting end 74 of the end mill 72 enables the mill to cut or form the general "U" shaped cross-section configuration or "D" shaped configuration of the bottom surfaces 32, 44, 58 of the embodiments of FIGS. 3-5, respectively, and form the cross-section configurations of the first side surfaces 34, 46, 60 of the spiral groove embodiments of FIGS. 3-5, respectively. As represented in FIG. 7, angling the end mill 72 in a vertical plane relative to the center axis 14 of the mandrel 12 enables cutting the groove cross-section configuration of the stage 3 embodiment of the spiral groove 54 shown in FIG. 5. Alternatively, the mandrel could be angled relative to the cutter.

As stated earlier, although the embodiments of the spiral groove cross-section configurations have been described referring to a blown film die mandrel 12 having a vertically oriented cylindrical exterior surface 10 in which the spiral grooves are formed, the cross-sections of the spiral groove embodiments described could also equally well be formed in mandrels having exterior surfaces that are horizontally oriented or planar, or are angled.

Figure 8:
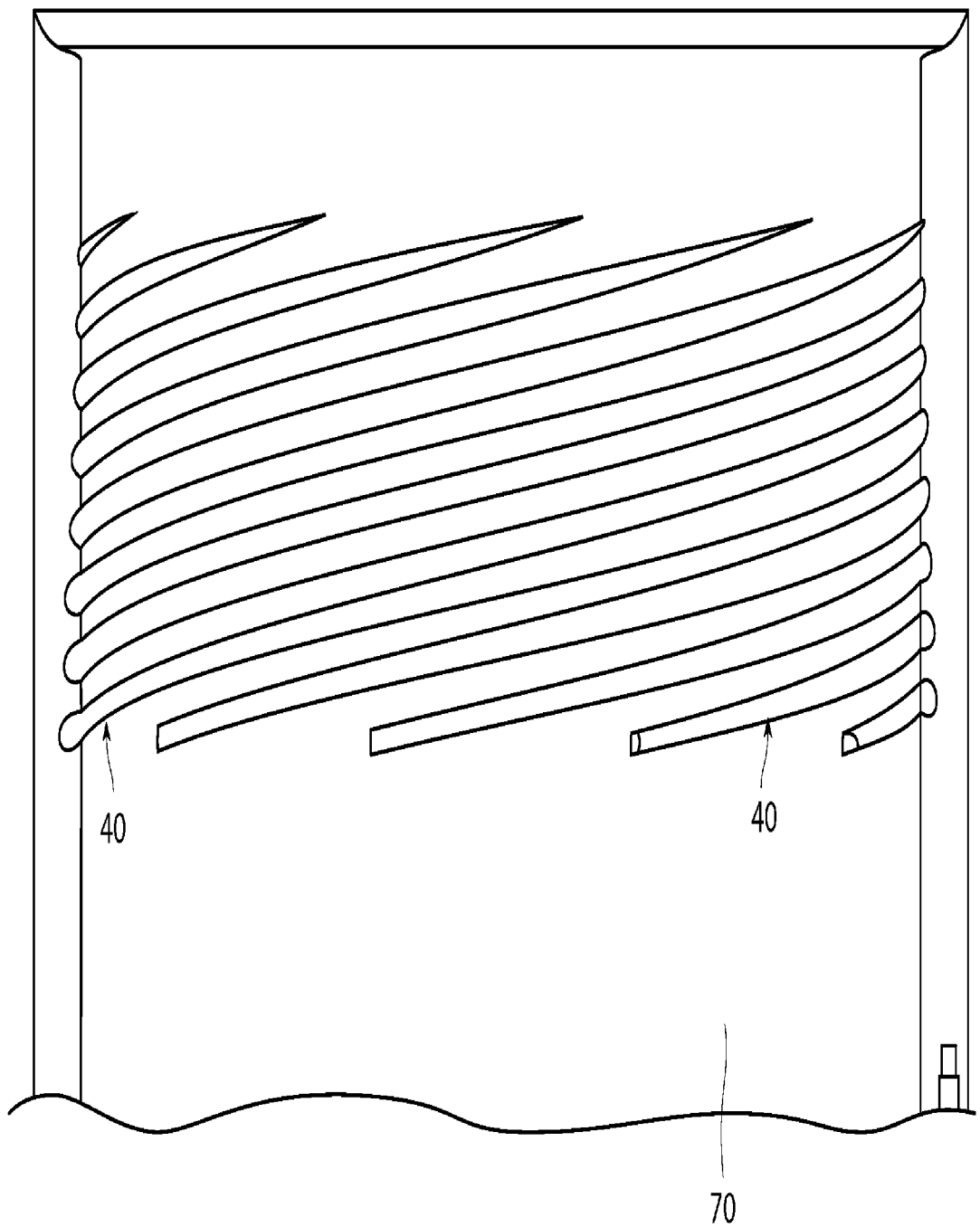
FIG. 8 is a representation of a cross-section of a cylindrical blown film die mandrel interior surface employing an embodiment of the spiral groove configuration of the invention.

FIG. 8 is a representation of the spiral groove 40 cross-section configuration of FIG. 4 that has been formed into an interior surface 70 of a vertically oriented cylindrical mandrel.

Figure 9:
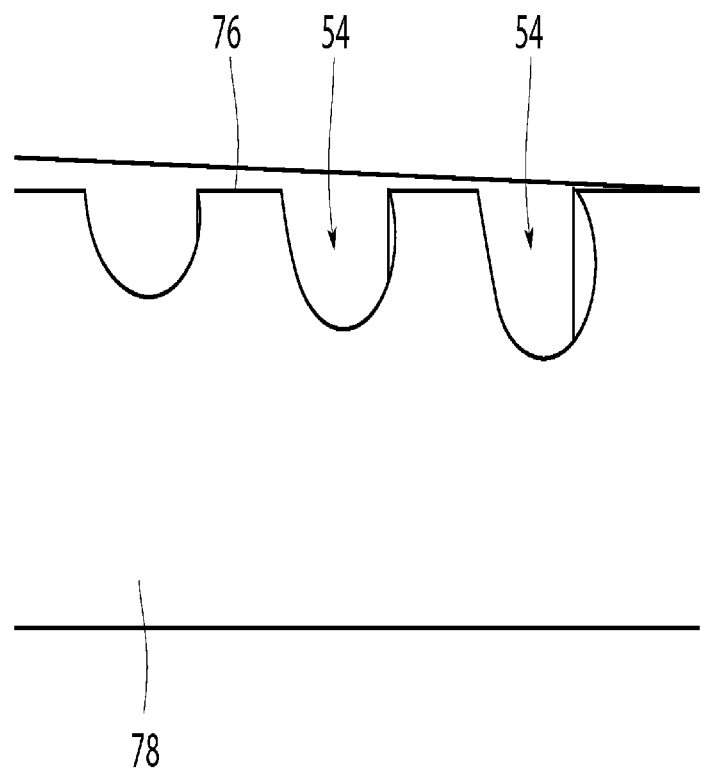
FIG. 9 is a representation of a cross-section of the spiral groove configurations of the invention employed on the top surface of a planar blown film die mandrel.

FIG. 9 is a representation of the spiral groove 54 cross-section configuration of FIG. 5 that has been formed into the top surface 76 of a horizontally oriented or planar mandrel 78. In the embodiment shown in FIG. 9 the flow direction is from right to left.

Figure 10:
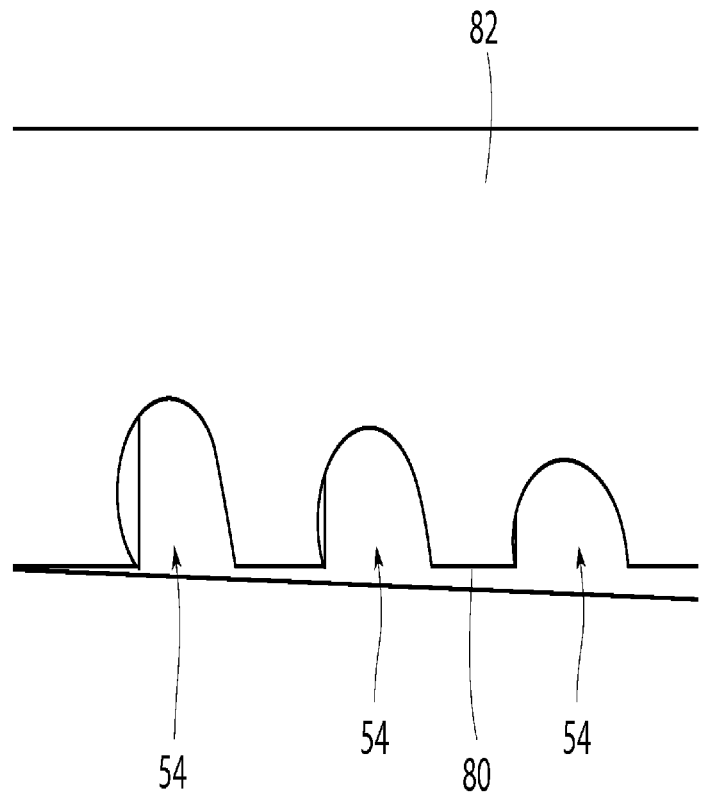
FIG. 10 is a representation of a cross-section of the spiral groove configurations of the invention employed on a bottom surface of a planar blown film die mandrel.

FIG. 10 is a representation of the spiral groove 54 cross-section configuration of FIG. 5 formed in the bottom surface 80 of a horizontally oriented or planar mandrel 82. In FIG. 10 the flow direction is from left to right.

Figure 11:
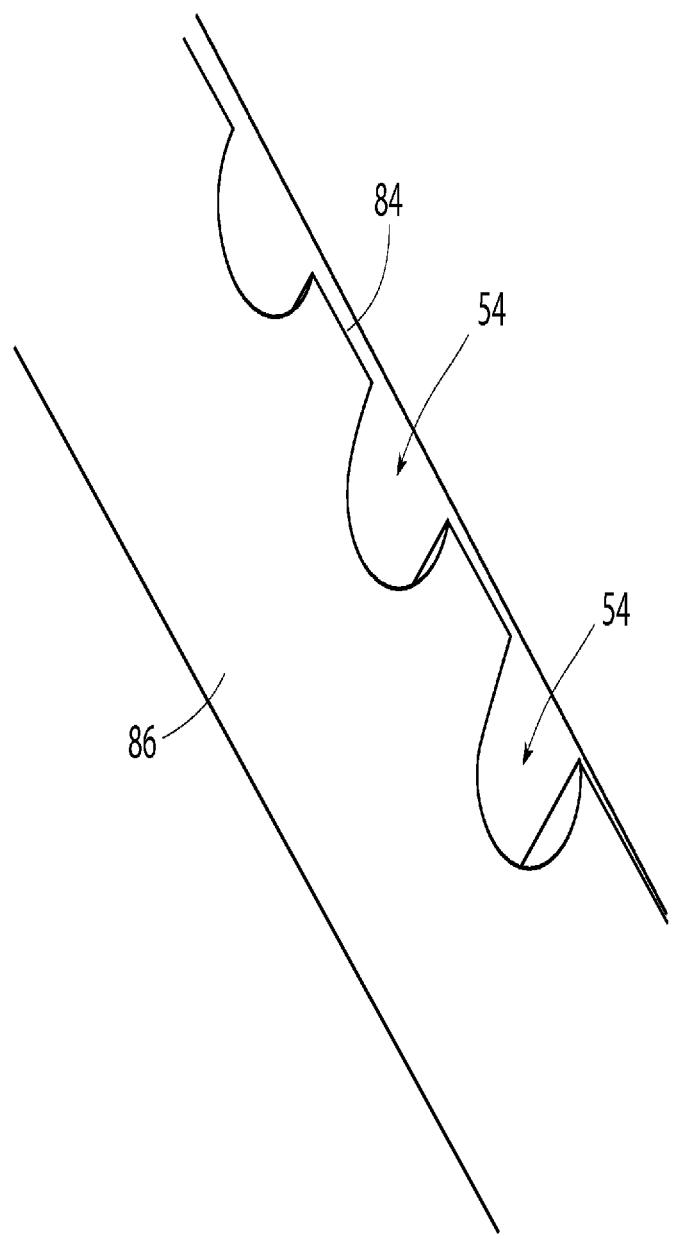
FIG. 11 is a representation of a cross-section of the spiral groove configurations of the invention employed on an upper surface of an annular blown film die mandrel.

FIG. 11 is a representation of the spiral groove 54 cross-section configuration of FIG. 5 formed in the top surface 84 of an angularly oriented mandrel 86. In FIG. 11 the flow direction is from right to left.

Figure 12:
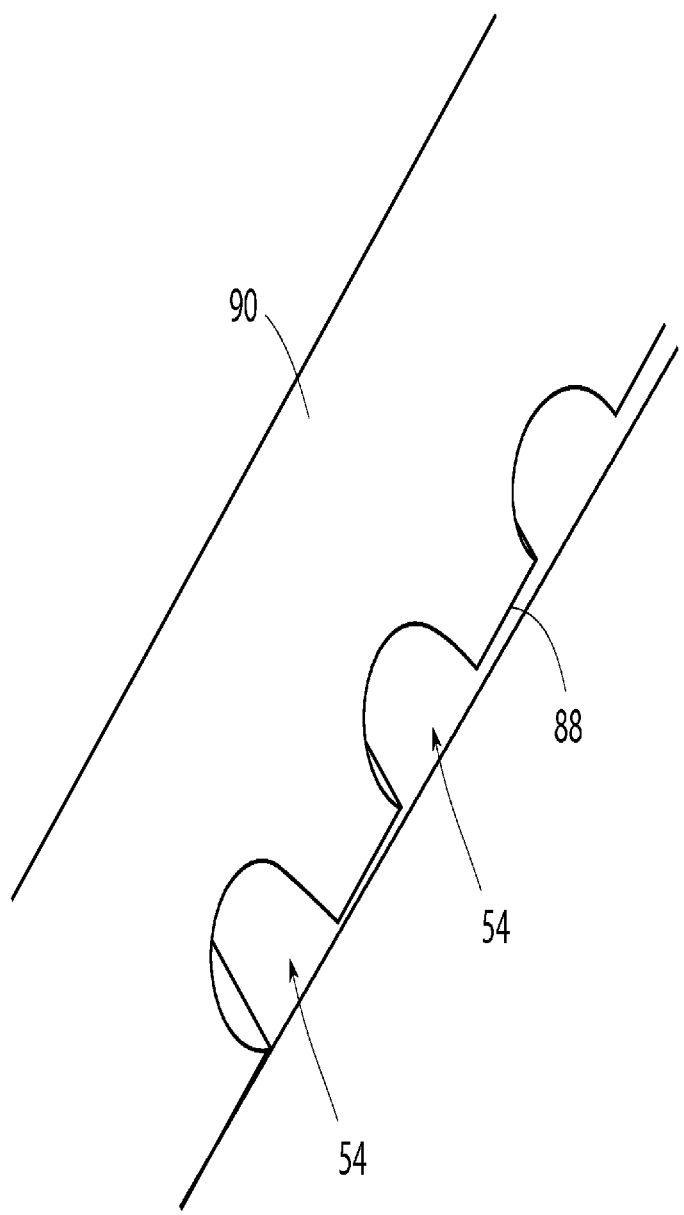
FIG. 12 is a representation of a cross-section of the spiral groove configurations of the invention employed on a bottom surface of an annular blown film die mandrel.

FIG. 12 is a representation of the spiral groove 54 cross-section configuration of FIG. 5 formed into the bottom surface 88 of an angularly oriented mandrel 90. In FIG. 12 the flow direction is from left to right. Note that the sprials can angle inwards as well as outwards.

Figure 1:
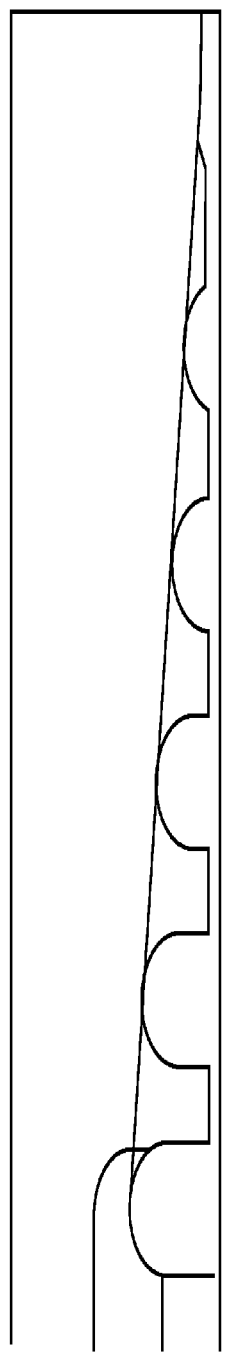
FIG. 1 is a representation of a cross-section configuration of a prior art spiral groove on an exterior surface of a cylindrical mandrel of a blown film die.

In each of the embodiments of the spiral groove cross-section configurations described above, the flow rate profile of liquid through the spiral groove is improved over that of prior art spiral groove cross-section configurations under similar conditions. The flow rate profile of liquid through spiral grooves having the cross-section configurations of the invention have been observed to be as much as three times greater in the spiral groove configurations of the invention than in prior art spiral groove configurations such as that shown in FIG. 1. Additionally, it has been observed that the shear rate of polymer melt flowing through a spiral groove having the cross-section configurations of the invention described above is as much as three times greater than the shear rate of polymer melt flowing through a spiral groove having a cross-section configuration of the prior art such as that shown in FIG. 1.

The increased shear rate and velocity of the polymer melt in the spiral groove configurations of the invention means that the polymer is kept above its critical speed and shear rate. This reduces the likelihood of the polymer stagnating, leading to the potential for degradation or taking an increased amount of time to purge the polymer from the blown film die when the system's transmission is transitioned to another polymer.

As various modifications could be made in the apparatus and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above described exemplary embodiments, but should be defined only in accordance with the following claims appended hereto and their equivalents.

The invention claimed is:

1. An annular die comprising:
   a mandrel having a surface;
   a spiral groove formed in the mandrel surface, the spiral groove having a length with opposite proximal and distal ends where the spiral groove proximal end receives a liquid flow and the spiral groove length directs the liquid flow from the proximal end of the spiral groove toward the distal end of the spiral groove and thereby distributes the flow of liquid across the mandrel surface and directs the flow of liquid in a flow direction across the spiral groove and across the mandrel surface; and
   at least a portion of the spiral groove having a cross-section configuration with a bottom surface, a first side surface and a second side surface, the second side surface is located on an opposite side of the bottom surface from the first side surface, the bottom surface has a u-shaped configuration and the first side surface curves toward the flow direction as the first side surface extends from the bottom surface to the mandrel surface and intersects with the mandrel surface.

2. The die of claim 1, further comprising:
   the mandrel surface being a cylindrical exterior surface of the mandrel.

3. The die of claim 1, further comprising:
   the mandrel surface being a cylindrical interior surface of the mandrel.

4. The die of claim 1, further comprising:
   the mandrel surface being a planar surface of the mandrel.

5. The die of claim 1, further comprising:
   the spiral groove spiraling around a center axis, the center axis defining mutually perpendicular axial and radial directions relative to the mandrel and relative to the die; and,
   the flow direction being an axial direction.

6. The die of claim 1, further comprising:
   the spiral groove spiraling around a center axis, the center axis defining mutually perpendicular axial and radial directions relative to the mandrel and relative to the die; and, the flow direction being a radial direction.

7. The die of claim 1, further comprising:
   the portion of the spiral groove having a cross section configuration where
   the second side surface is a mirror image of the first side surface.

8. The die of claim 1, further comprising:
   the mandrel being a first mandrel of first and second mandrels of the die, the second mandrel having a second surface;
   a second spiral groove formed in the second surface, the second spiral groove having a length with opposite proximal and distal ends where the second spiral groove proximal end receives a liquid flow and the second spiral groove length directs the liquid flow from the second spiral groove proximal end toward the second spiral groove distal end and thereby distributes the flow of liquid across the second surface and directs the flow of liquid in a flow direction across the second spiral groove and across the second surface; and,
   at least a portion of the second spiral groove having a cross-section configuration where an interior surface of the second spiral groove portion is oriented toward the flow direction as the interior surface of the second spiral groove portion extends to and intersects with the second mandrel surface.

9. An annular die comprising:
   a mandrel having a surface;
   a spiral groove formed in the mandrel surface, the spiral groove having a length with opposite proximal and distal ends where the spiral groove formed on the mandrel surface directs a flow of liquid in a flow direction through the die; and,
   at least a portion of the spiral groove having a cross-section configuration with a bottom surface and opposite first and second side surfaces on opposite sides of the bottom surface,
   the bottom surface has a u-shaped configuration and the first surface curves toward the flow direction as the first side surface extends from the bottom surface to the mandrel surface and intersects with the mandrel surface.

10. The die of claim 9, further comprising:
    the mandrel surface being a cylindrical exterior surface of the mandrel.

11. The die of claim 9, further comprising:
    the mandrel surface being a cylindrical interior surface of the mandrel.

12. The die of claim 9, further comprising:
    the mandrel surface being a planar surface of the mandrel.

13. The die of claim 9, further comprising:
    the spiral groove spiraling around a center axis, the center axis defining mutually perpendicular axial and radial directions relative to the mandrel and the die; and,
    the flow direction being an axial direction.

14. The die of claim 9, further comprising:
    the spiral groove spiraling around a center axis, the center axis defining mutually perpendicular axial and radial directions relative to the mandrel and relative to the die; and,
    the flow direction being in a radial direction.

15. The die of claim 9, further comprising:
    the second side surface is a mirror image of the first side surface.

16. The die of claim 9, further comprising:
    the mandrel being a first mandrel of first and second mandrels of the die, the second mandrel having a second surface;
    a second spiral groove formed in the second surface, the second spiral groove having a length with opposite proximal and distal ends where the second spiral groove formed on the second surface directs a flow of liquid in the flow direction through the die; and,
    at least a portion of the second spiral groove having a bottom surface and opposite first and second side surfaces on opposite sides of the bottom surface, where at least one of the first and second side surfaces of the second spiral groove is oriented toward the flow direction as the at least one side surface of the second spiral groove extends from the bottom surface of the second spiral groove to the second surface.

17. The die of claim 9, further comprising:
    the bottom surface of the portion of the groove having a u-shape.

* * * * *